April 7, 1925.

A. W. KAUFMAN 1,532,756

COMBINATION STEP PLATE AND LUGGAGE CARRIER

Filed Aug. 18, 1922

Witness:
R. E. Weber

Inventor:
Adam W. Kaufman
By
Attorneys

Patented Apr. 7, 1925.

1,532,756

UNITED STATES PATENT OFFICE.

ADAM W. KAUFMAN, OF MILWAUKEE, WISCONSIN.

COMBINATION STEP PLATE AND LUGGAGE CARRIER.

Application filed August 18, 1922. Serial No. 582,629.

*To all whom it may concern:*

Be it known that I, ADAM W. KAUFMAN, a citizen of the United States, and resident of Milwaukee, in the county of Milwaukee and State of Wisconsin, have invented certain new and useful Improvements in Combination Step Plates and Luggage Carriers; and I do hereby declare that the following is a full, clear, and exact description thereof.

This invention relates to a combined step plate and luggage carrier, and is particularly directed to such a device adapted to be applied to automobiles.

Objects of this invention are to provide a device which performs the dual function of a step plate and luggage carrier; which, when not in use as a luggage carrier, not only occupies a minimum of space, but also performs the useful function of a step plate; which does not detract from the appearance of the automobile when it is functioning in either capacity, but which enhances the appearance of the automobile.

Further objects are to provide a combined step plate and luggage carrier which will protect the apron of the automobile adjacent the running board, which may be securely locked in either position, and which may be cheaply and readily produced.

An embodiment of this invention is shown in the accompanying drawing, in which:—

Figure 1:
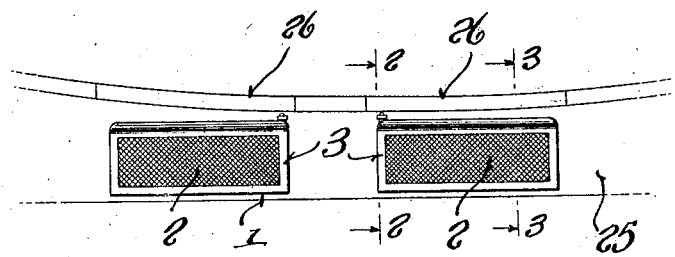
Figure 1 is a fragmentary plan view of the running board and adjacent portions of an automobile, with the device in place.

The device comprises a step plate 1, which may conveniently be provided with a roughened surface 2 surrounded by a smooth marginal portion 3 and provided upon its inner edge with an upwardly extending curved protecting flange 4. This plate may be provided with downwardly projecting flanges 5 to strengthen it. It is pivoted by means of an elongated pin 6 to a pair of base members 7, these members 7 being provided with suitable countersunk holes through which attaching bolts 8 are passed.

Figure 2:
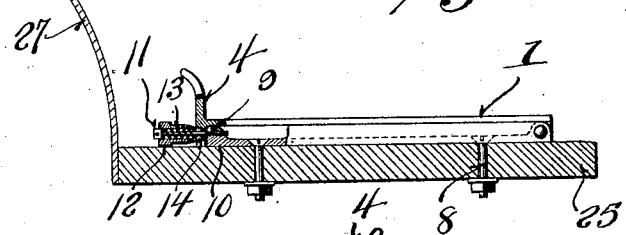
Figure 2 is a sectional view of the device in collapsed position, such section being taken on the line 2—2 of Figure 1.
Figure 3:
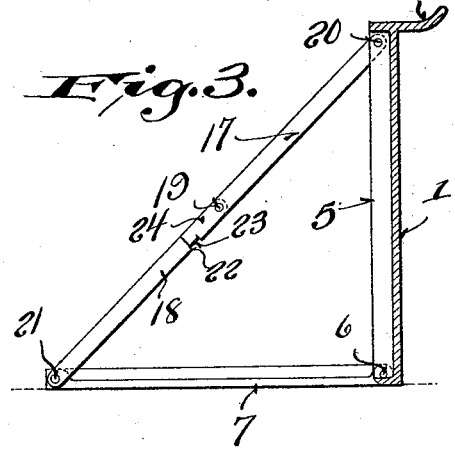
Figure 3 is a sectional view of the device in open or extended position, such section being taken on the line 3—3 of Figure 1.

Means are provided for holding the bearing plate in both the extended or outwardly directed position, as shown in Figure 3, and in the collapsed position, as shown in Figures 1 and 2. Any convenient form of latch may be employed for retaining the plate in closed position.

Figure 4:
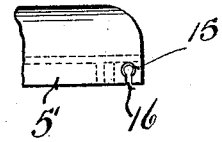
Figure 4 is a detail of a portion of the latch for locking the device in collapsed position.

In the form shown in the drawing, a pin 9 is secured within the thickened portion 10 of one of the base members and is provided with a cylindrical head 11. A movable slide 12 is interiorly bored to accommodate the head 11 at one end and the pin portion 9 at the other end. It is to be noted that the slide 12 has a relatively large aperture through its major portion which accommodates the head 11 of the pin. A helical spring 13 is positioned within the other bored portion of the slide, such spring bearing at one end against the bottom of the enlarged bored portion and at its other end against the head 11 of the screw. The forward end of the slide is conically shaped, as indicated at 14, and seats within a conically formed aperture 15 formed in the rear downwardly projecting flange 5′ of the step plate. A slot 16 passes upwardly into the aperture 15, as may be seen from Figure 4, thereby permitting the plate to be rocked upwardly or downwardly past the pin 9.

The means for retaining the plate in its extended position, as shown in Figure 3, may comprise a pair of links 17 and 18, which are pivotally joined to each other, as indicated at 19, and to the plate and base portion, as indicated at 20 and 21, respectively. One of the links 18 may be provided with a cut-out portion 22, within which an ear 23 formed upon an extension 24 of the link 17 is adapted to fit when the links are in their extended position, as shown in Figure 3. In this manner these links are locked against inadvertent folding motion. However, when it is desired to collapse the device, it is merely necessary to press the links inwardly adjacent their pivot point 19, thereby causing them to fold beneath the plate 1.

This combined step plate and luggage carrier may be provided as a single element, or a pair of such devices may be provided upon the running board 25, as shown in Figure 1, each of the devices being positioned adjacent a door 26. When two such devices are used, the jointed pivoted links 17 and 18 are provided only at the outer ends of each of the combined plate and luggage carriers, so that the space between the forward edge of one and the rear edge of the other may be unobstructed to receive elongated packages when the two step plates are in their upwardly projecting position. If, however, a single step plate is employed, it may be conveniently provided with jointed links at both ends, so as to form suitable retaining members to prevent shifting of the luggage.

It will be seen that an extremely serviceable combined luggage carrier and step plate has been provided, in which the mechanism for retaining it in extended position is adequately housed when the plate is in its horizontal position, as shown in Figure 1, and such plate prevents the entrance of dirt or mud into the space between such plate and the running board. It is also to be noted that the curved flange 4 provides a protection for the apron 27 and prevents a person from injuring or marrying the apron by inadvertently kicking it with the toe of a shoe as he enters the machine.

It will be seen that a highly serviceable combined step plate and luggage carrier has been provided, which is efficient as a lugggage carrier or as a step plate, and when folded or collapsed, occupies a minimum of space and also serves the useful purpose of a serviceable step plate. These devices may be formed of any attractive metal such as aluminum, if desired, and it will therefore become apparent that they will enhance the ornamental appearance of a car in addition to serving their several useful functions.

Although one form of the invention has been described in considerable detail, it is to be understood that the invention may be embodied in various forms and is, therefore, to be limited only as set forth in the appended claims.

I claim:—

1. A combined step plate and luggage carrier for a running board, comprising a roughened plate adapted to lie above and substantially parallel to the running board or to extend upwardly therefrom, a base pivotally joined to the outer portion of said plate, pivotally joined arms pivoted to said base and plate and adapted to retain said plate at an angle to the running board and adapted to fold beneath said plate, and a latch for retaining said plate when substantially paralleling said running board.

2. A combined step plate and luggage carrier for a running board, comprisng a roughened plate having an upwardly extending flange and adapted to lie above and substantially parallel to the running board or to extend upwardly therefrom, a base pivotally joined to the outer portion of said plate, pivotally jointed arms pivoted to said base and plate and adapted to retain said plate at an angle to the running board and adapted to fold beneath said plate, and a latch for retaining said plate when substantially paralleling said running board.

In testimony that I claim the foregoing I have hereunto set my hand at Milwaukee, in the county of Milwaukee and State of Wisconsin.

ADAM W. KAUFMAN.